United States Patent
Chmaytelli et al.

(10) Patent No.: US 8,249,577 B2
(45) Date of Patent: *Aug. 21, 2012

(54) METHOD AND APPARATUS FOR NETWORK INITIATED UNINSTALLATION OF APPLICATION PROGRAM OVER WIRELESS NETWORK

(75) Inventors: Mazen Chmaytelli, San Diego, CA (US); Brian Minear, San Diego, CA (US); Jason Kenagy, La Jolla, CA (US); Paul Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,228

(22) Filed: Jun. 7, 2010

(65) Prior Publication Data
US 2010/0248709 A1 Sep. 30, 2010

Related U.S. Application Data

(63) Continuation of application No. 09/825,588, filed on Apr. 3, 2001, now Pat. No. 7,734,285.

(51) Int. Cl.
*H04M 3/00* (2006.01)
(52) U.S. Cl. ......... 455/419; 455/420; 455/466; 717/168
(58) Field of Classification Search .......... 455/418–420, 455/466, 550.1; 717/168
See application file for complete search history.

(56) References Cited

U.S. PATENT DOCUMENTS

| | | | |
|---|---|---|---|
| 5,155,847 A | * | 10/1992 | Kirouac et al. ............... 709/221 |
| 5,247,683 A | * | 9/1993 | Holmes et al. ............... 709/221 |
| 5,297,191 A | | 3/1994 | Gerszberg |
| 5,421,017 A | | 5/1995 | Scholz et al. |
| 5,430,877 A | | 7/1995 | Naylor |
| 5,442,553 A | | 8/1995 | Parrillo |

(Continued)

FOREIGN PATENT DOCUMENTS

EP 1049006 2/2001
(Continued)

OTHER PUBLICATIONS

European Search Report—EP09172237—Search Authority—Munich Patent Office—Nov. 11, 2009.
(Continued)

*Primary Examiner* — Sharad Rampuria
(74) *Attorney, Agent, or Firm* — Fariba Yadegar-Bandari

(57) ABSTRACT

Network-initiated uninstallation of programs on remote modules, such as wireless telephones, is performed over a wireless network to recall programs stored on the wireless telephone that are faulty or harmful to the wireless telephone, the wireless network, or a user of the wireless telephone. If one or more recall criteria are met for uninstallation of a targeted application program, a recall command source constructs a recall command. A program manager, using a database containing information about each program downloaded onto each wireless telephone in the network, identifies, for the recall command source, which wireless telephones carry the targeted application program. The recall command includes a unique application identification for the targeted application program and an instruction to the wireless telephone to uninstall the targeted application program. The recall command is broadcast over the wireless network to the wireless telephones. In response to the recall command, the wireless telephone automatically uninstalls the targeted application program by executing a recall program on the wireless telephone.

29 Claims, 6 Drawing Sheets

U.S. PATENT DOCUMENTS

| | | |
|---|---|---|
| 5,524,276 A | 6/1996 | Littig et al. |
| 5,553,314 A | 9/1996 | Grube et al. |
| 5,555,416 A | 9/1996 | Owens et al. |
| 5,675,630 A | 10/1997 | Beatty |
| 5,689,825 A | 11/1997 | Averbuch et al. |
| 5,764,992 A | 6/1998 | Kullick et al. |
| 5,768,566 A | 6/1998 | Harikrishnan et al. |
| 5,787,288 A | 7/1998 | Nagata et al. |
| 5,790,800 A | 8/1998 | Gauvin et al. |
| 5,794,142 A | 8/1998 | Vanttila et al. |
| 5,805,897 A | 9/1998 | Glowny |
| 5,848,064 A | 12/1998 | Cowan |
| 5,860,012 A | 1/1999 | Luu |
| 5,862,474 A | 1/1999 | Kimball |
| 5,881,236 A | 3/1999 | Dickey |
| 5,896,566 A | 4/1999 | Averbuch et al. |
| 5,909,581 A | 6/1999 | Park |
| 5,915,225 A | 6/1999 | Mills |
| 5,940,074 A | 8/1999 | Britt, Jr. et al. |
| 5,950,130 A | 9/1999 | Coursey |
| 5,953,532 A | 9/1999 | Lochbaum |
| 5,974,312 A | 10/1999 | Hayes, Jr. et al. |
| 6,009,274 A | 12/1999 | Fletcher et al. |
| 6,031,830 A | 2/2000 | Cowan |
| 6,049,663 A | 4/2000 | Harikrishnan et al. |
| 6,148,197 A | 11/2000 | Bridges et al. |
| 6,223,028 B1 | 4/2001 | Chang et al. |
| 6,237,144 B1 | 5/2001 | Delo |
| 6,256,493 B1 | 7/2001 | Dorenbosch et al. |
| 6,259,932 B1 | 7/2001 | Constien |
| 6,289,512 B1 | 9/2001 | Edwards et al. |
| 6,317,593 B1 | 11/2001 | Vossler |
| 6,367,075 B1 | 4/2002 | Kruger et al. |
| 6,370,389 B1 | 4/2002 | Isomursu et al. |
| 6,374,401 B1 | 4/2002 | Curtis |
| 6,378,128 B1 | 4/2002 | Edelstein et al. |
| 6,381,454 B1 | 4/2002 | Tiedemann, Jr. et al. |
| 6,408,175 B1 | 6/2002 | Park |
| 6,453,469 B1 * | 9/2002 | Jystad .......................... 717/174 |
| 6,459,892 B2 | 10/2002 | Burgan et al. |
| 6,484,025 B1 | 11/2002 | Chan et al. |
| 6,493,549 B1 | 12/2002 | Axelson et al. |
| 6,496,979 B1 | 12/2002 | Chen et al. |
| 6,549,770 B1 | 4/2003 | Marran |
| 6,553,223 B1 | 4/2003 | Bayley et al. |
| 6,587,684 B1 | 7/2003 | Hsu et al. |
| 6,591,098 B1 | 7/2003 | Shieh et al. |
| 6,615,038 B1 * | 9/2003 | Moles et al. ................. 455/418 |
| 6,622,017 B1 | 9/2003 | Hoffman |
| 6,633,758 B1 | 10/2003 | Heinonen et al. |
| 6,643,506 B1 | 11/2003 | Criss et al. |
| 6,668,289 B2 | 12/2003 | Cheng et al. |
| 6,675,201 B1 | 1/2004 | Parkkinen |
| 6,684,397 B1 | 1/2004 | Byer et al. |
| 6,687,496 B1 | 2/2004 | Nangle |
| 6,687,901 B1 | 2/2004 | Imamatsu |
| 6,714,992 B1 | 3/2004 | Kanojia et al. |
| 6,832,373 B2 | 12/2004 | O'neill |
| 6,836,657 B2 * | 12/2004 | Ji et al. .......................... 455/419 |
| 6,865,387 B2 | 3/2005 | Bucknell et al. |
| 6,886,017 B1 | 4/2005 | Jackson et al. |
| 6,965,928 B1 | 11/2005 | Cox et al. |
| 7,096,004 B2 | 8/2006 | Minear et al. |
| 7,123,933 B2 | 10/2006 | Poor et al. |
| 7,587,713 B1 | 9/2009 | Barrett et al. |
| 7,734,285 B2 * | 6/2010 | Chmaytelli et al. .......... 455/419 |
| 7,805,719 B2 * | 9/2010 | O'Neill ........................ 717/168 |
| 2001/0011341 A1 | 8/2001 | Hayes, Jr. et al. |
| 2001/0029178 A1 * | 10/2001 | Criss et al. .................... 455/419 |
| 2002/0067504 A1 | 6/2002 | Salgado et al. |
| 2002/0072359 A1 | 6/2002 | Moles et al. |
| 2002/0131404 A1 * | 9/2002 | Mehta et al. .................. 370/352 |
| 2002/0193101 A1 | 12/2002 | McAlinden |
| 2003/0033599 A1 * | 2/2003 | Rajaram et al. ............... 717/173 |
| 2003/0078036 A1 * | 4/2003 | Chang et al. .................. 455/419 |
| 2003/0186689 A1 * | 10/2003 | Herle et al. ................... 455/418 |
| 2003/0208573 A1 | 11/2003 | Harrison et al. |
| 2004/0038675 A1 | 2/2004 | Criss et al. |
| 2005/0267935 A1 * | 12/2005 | Gandhi et al. ................ 709/203 |
| 2007/0261047 A1 * | 11/2007 | Sah et al. ...................... 717/168 |

FOREIGN PATENT DOCUMENTS

| | | |
|---|---|---|
| GB | 2341774 | 3/2000 |
| JP | 08106393 | 4/1996 |
| JP | 11194929 | 7/1999 |
| JP | 11298959 | 10/1999 |
| RU | 2151468 C1 | 6/2000 |
| WO | WO9716938 | 5/1997 |
| WO | WO9732439 | 9/1997 |
| WO | WO9922325 A1 | 5/1999 |
| WO | WO0067112 | 11/2000 |
| WO | WO0163411 | 8/2001 |
| WO | WO0244892 | 6/2002 |

OTHER PUBLICATIONS

European Search Report—EP10182829—Search Authority—Munich—Mar. 10, 2011.

International Search Report—International Search Authority—European Patent Office—PCT/US02/10254—Oct. 22, 2003.

Translation of Office Action in Russian application 2003132072 corresponding to U.S. Appl. No. 12/795,228, citing WO9922325 and RU2151468 dated Apr. 11, 2011.

* cited by examiner

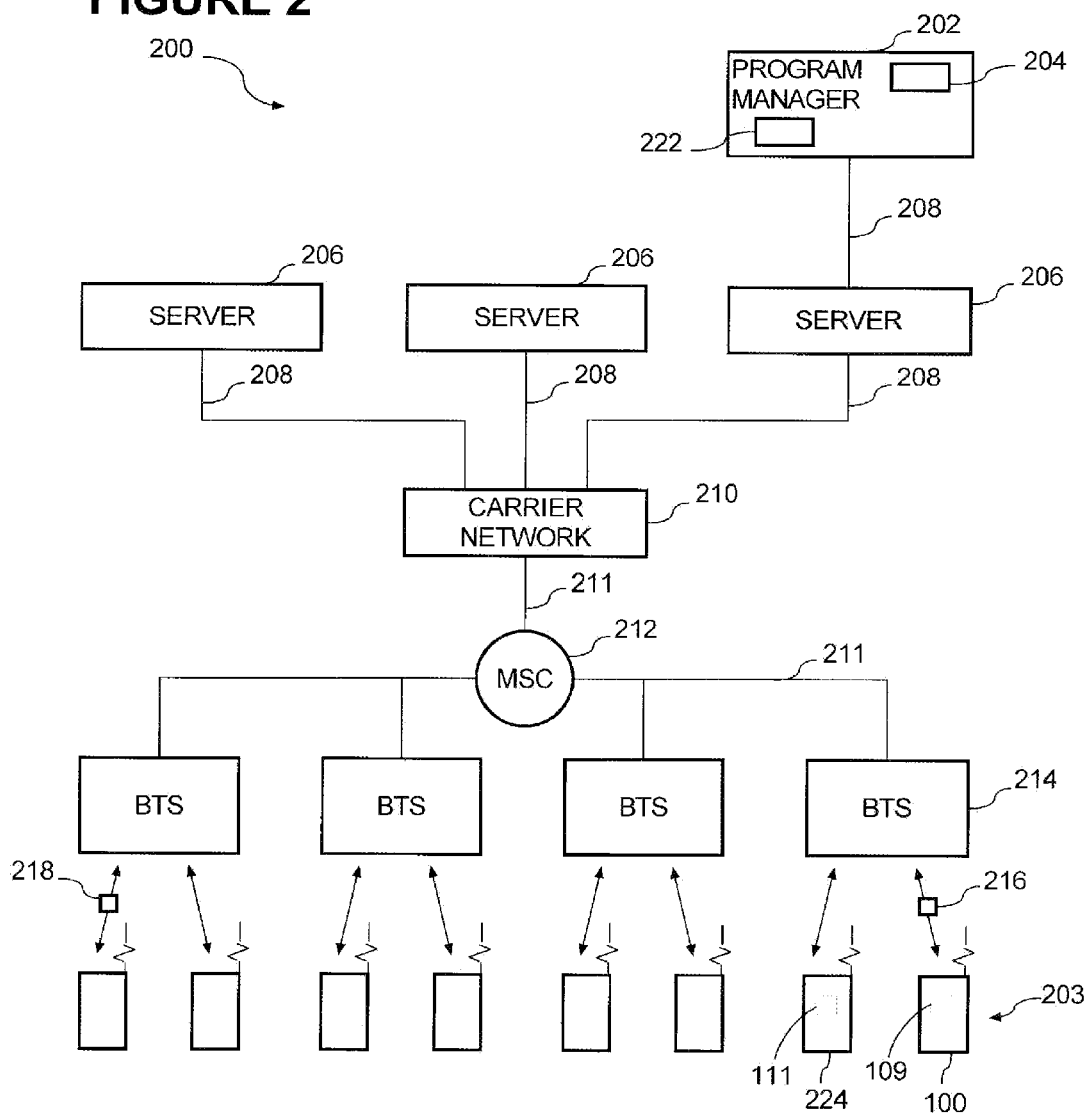

FIGURE 3a  PROGRAM MANAGER DATABASE

| APPLICATION ID FOR APPLICATION PROGRAMS (302) | ESN OF INDIVIDUAL WHO DOWNLOADED APPLICATION PROGRAMS (304) | MIN (MOBILE IDENTIFICATION NUMBERS) (306) | PHONE MODEL (308) | CARRIER (310) | REGION (312) |
|---|---|---|---|---|---|
| TETRIS™ 100X | 9002X | (363) 555-4613 | SONY™ 3250 | ATT™ | CA |
| TABLE TENNIS 102Y | 9003X | (496) 555-9629 | SAMSUNG™ 9840 | AIR-TOUCH™ | CA |
| RACECAR 104Z | 9004X | (903) 555-9671 | QEST 2001 | QRSTU | CA |

(204)

FIGURE 3b  LOCAL DATABASE OF APPLICATION PROGRAMS

| APPLICATION ID FOR APPLICATION PROGRAMS (302) | LOCATION OF APPLICATION PROGRAM ON WIRELESS TELEPHONE (314) |
|---|---|
| TETRIS™ 100X | Z012 |
| TABLE TENNIS 102Y | Y015 |
| RACECAR 104Z | X021 |

(112)

METHOD AND APPARATUS FOR NETWORK INITIATED UNINSTALLATION OF APPLICATION PROGRAM OVER WIRELESS NETWORK

CLAIM OF PRIORITY UNDER 35 U.S.C. §120

This application is a continuation of U.S. patent application Ser. No. 09/825,588, entitled "METHOD AND APPARATUS FOR NETWORK INITIATED UNINSTALLATION OF APPLICATION PROGRAM OVER WIRELESS NETWORK", filed on Apr. 3, 2001, pending, and assigned to the assignee hereof and hereby expressly incorporated by reference herein.

BACKGROUND OF THE INVENTION

1. Field of the Invention

This invention relates to the remote maintenance and deletion of programs using a wireless network. More particularly, the invention concerns a network initiated "recall" or uninstallation of targeted application programs on remote modules such as wireless telephones.

2. Description of the Related Art

Wireless telephones, commonly used to communicate over a wireless network, are evolving into an apparatus that provides its users with the same benefits of personal computers and hand-held personal digital assistants ("PDAs"). This transition from telephone to computer is being accomplished by the manufacturer's installation of application programming interfaces ("APIs") onto the wireless telephones. Software developers, using special software developer kits, are writing programs specifically designed to be compatible with the wireless telephones having an API.

The APIs allow users of the wireless telephones to download and operate various programs using the wireless telephones. As a result, it is anticipated that users of wireless telephones will customize their wireless telephones with programs that the user finds useful and entertaining. For example, the user may use the wireless telephone to play games, read books, get stock updates and other news information, or any other type of information or program that the user of the wireless telephone desires.

It is also anticipated that the programs will come pre-loaded at the time the wireless telephone is purchased, or the user may later request that additional programs be downloaded wirelessly over-the-air. The user of the wireless telephone also may delete programs from the wireless telephone as necessary or when desired.

However, unlike traditional personal computers, wireless telephones communicate and operate over a wireless network that is used by many other people to communicate. If the wireless network crashes or is saturated, people will not be able to use the wireless telephones for their traditional and important basic function of communication.

A faulty program downloaded onto a wireless telephone may saturate the wireless network, cause the network to crash, or even pose safety risks to the user of the wireless telephone. For example, a faulty program may interfere with, or even stop, the performance of entire parts of the wireless network, including the base stations that broadcast messages to the wireless telephones. A faulty program also may cause the wireless telephones to saturate a network and prevent the routing of high priority calls, such as 911 calls. There also may be safety concerns if a faulty program caused a wireless telephone to emit radio frequencies outside of normal, safe ranges.

SUMMARY OF THE INVENTION

Broadly, the present invention concerns network-initiated uninstallation (or "recall") of one or more programs on remote modules such as wireless telephones. The recall is performed over a wireless network.

Circumstances will arise dictating a recall of one or more programs downloaded onto wireless telephones. A recall may be necessary in response to customer dissatisfaction with the performance of a particular program, in response to the detection of a pattern of problems affecting the wireless network linked to a program, and/or a program that causes the wireless telephone to malfunction or cease operating.

In response to these circumstances, one or more persons or entities involved with the development and/or issuance of the program, the manufacturer of the wireless telephone, and/or persons or entities involved with the function of the wireless network (such as a wireless telephone network provider or "carrier") (collectively or singly referred to as "recall command source") decide whether a recall is necessary. For each program to be recalled ("targeted application program"), the recall command source constructs a recall command.

The recall command includes, at a minimum, a unique application identification for the targeted application program and an instruction to the wireless telephone to uninstall the targeted application program. A database maintained by a program manager keeps track of the application identifications for each program downloaded onto the wireless telephones, and also keeps track of which wireless telephones have the targeted application program downloaded onto them.

The recall command source constructs the recall command and sends it to the wireless network. The base stations in the wireless network broadcast the recall command to the wireless telephones. Upon receipt of the recall command, the wireless telephones automatically begin the process for uninstalling the targeted application program.

Alternatively, the recall command source may send a more limited recall message to the wireless telephone. The recall message instructs the wireless telephone to send a message to the recall command source or another component of the wireless network to obtain the information necessary to uninstall the targeted application program.

Another aspect of the invention involves a recall process initiated by the wireless telephone. In this embodiment, the wireless telephone is programmed to periodically send a message over the wireless network to the recall command source. The recall command source, when contacted by the wireless telephone, sends a recall command to the wireless telephone for any applications that need to be uninstalled. Alternatively, the recall command instructs the wireless telephone to contact another component of the wireless network to obtain the information necessary to uninstall the targeted application program.

Accordingly, one embodiment of the invention involves different methods for uninstalling one or more targeted application programs resident upon a wireless telephone. A recall command source remotely issues a recall command in response to which the wireless telephone automatically uninstalls the targeted application program. Alternatively, the wireless telephone periodically sends messages to the recall command source for any recall commands, in response to which the wireless telephone automatically uninstalls the targeted application program.

In another embodiment, the invention involves an apparatus, such as a wireless telephone, configured and programmed to automatically uninstall a targeted application program in response to a network initiated recall command. Alternatively, the wireless telephone is configured and programmed to periodically send messages to obtain any recall commands, in response to which the wireless telephone also is configured and programmed to automatically uninstall a targeted application program.

The invention affords a number of distinct advantages. Chiefly, the invention affords a mechanism for controlling, through network initiated uninstallation, faulty or harmful application programs downloaded onto wireless telephones. Significantly, the process is initiated and controlled by persons or entities operating the wireless network, or the wireless telephone itself, and not the user of the wireless telephone. The program manager identifies which wireless telephones have the targeted application program, and the recall process is specifically targeted to those wireless telephones. This aspect ensures a high degree of uniformity, speed, and accuracy in the recall process. The invention also provides a number of other advantages and benefits that should be apparent from the following description of the invention.

DESCRIPTION OF DRAWINGS

FIG. 2 is a block diagram of the hardware components of an exemplary wireless network providing communication between different components, including a program manager and wireless telephones, in accordance with the invention.

FIG. 3a shows a table of data maintained by the program manager in a program manager database in accordance with the invention.

FIG. 3b shows a table of data maintained by the wireless telephone in a local database of application programs in accordance with the invention.

DESCRIPTION OF PREFERRED EMBODIMENT

The nature, objectives, and advantages of the invention will become more apparent to those skilled in the art after considering the following detailed description in connection with the accompanying drawings. As mentioned above, the invention concerns network initiated uninstallation of one or more targeted application programs on a remote module, such as a wireless telephone.

HARDWARE COMPONENTS & INTERCONNECTIONS

Figure 1:
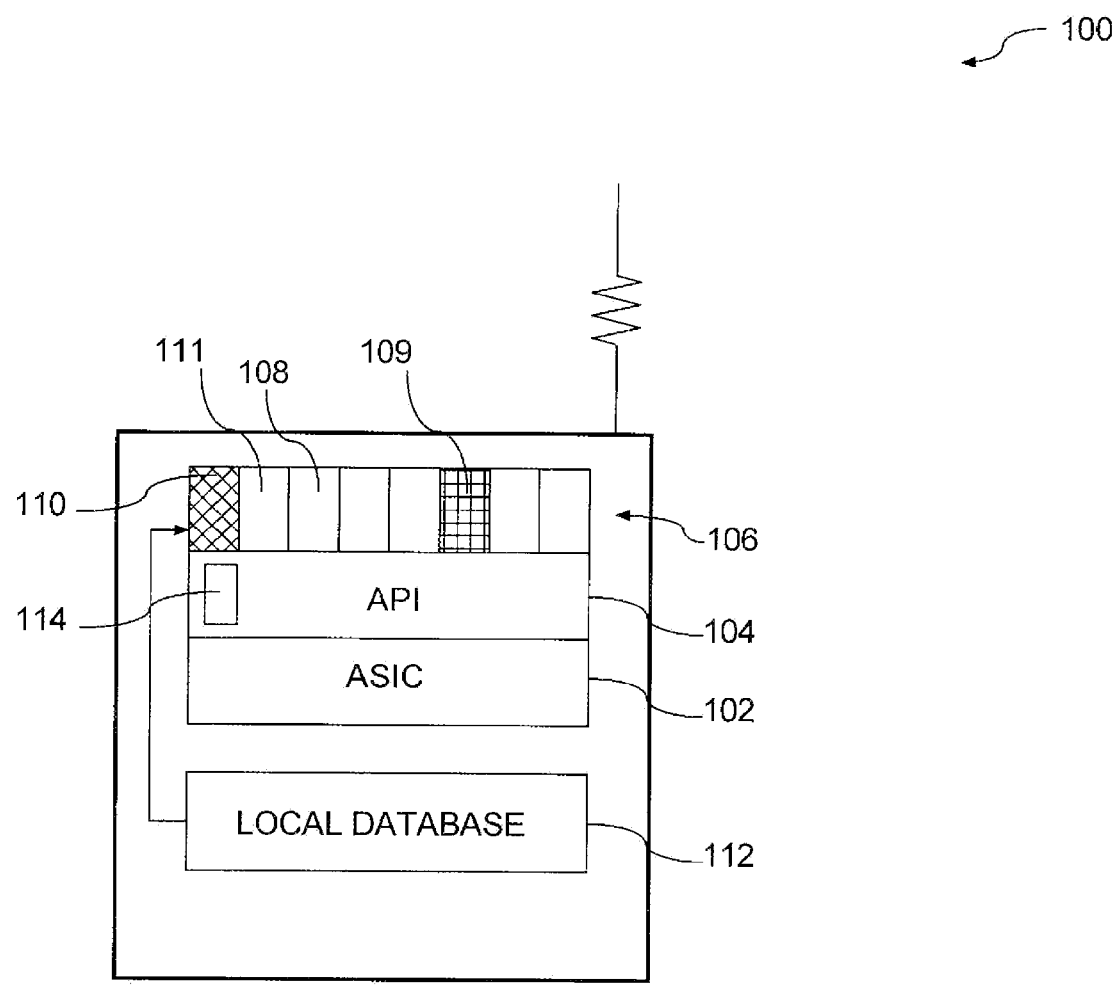
FIG. 1 is a block diagram of the hardware components and interconnections of a wireless telephone including a recall program resident thereon in accordance with the invention.

Wireless Telephone
Referring to FIG. 1, the invention is illustrated in the context of a wireless telephone 100. The wireless telephone 100 is used as an example without any intended limitation. The invention may alternatively be performed on any form of remote module capable of communicating though a wireless network, including without limitation, personal digital assistants ("PDAs"), wireless modems, PCMCIA cards, access terminals, personal computers, access terminals, telephones without a display or keypad, or any combination or sub-combination thereof. These examples of remote modules also may have a user interface, such as a keypad, visual display or sound display.

The exemplary wireless telephone 100 shown in FIG. 1 includes a microprocessor, logic circuit, assembly of discrete circuit elements, application-specific integrated circuit (ASIC), or other data processing entity. In the example of FIG. 1, this processing entity is implemented as an ASIC 102 installed at the time the wireless telephone 100 is manufactured. The ASIC is a hardware component that is driven by software included in the ASIC. This processing circuitry may also include an API, as illustrated by the API 104, which is installed in the wireless telephone 100 at the time of manufacture. The API 104 is a software layer configured to interact with the ASIC and runs on the ASIC hardware. The API 104 serves as an interface between the ASIC 102 hardware and application programs 108 (discussed below) installed on the wireless telephone 100. Alternatively, the wireless telephone 100 may contain any other form of circuitry that would allow programs to be operated in a manner that is compatible with the hardware configuration of the wireless telephone 100. The wireless telephone 100 also includes storage 106. The storage 106 comprises RAM and ROM, but alternatively may be any form of memory such as EPROM, EEPROM or flash card inserts.

Referring to FIG. 1, the manufacturer (not shown) of the wireless telephone 100 downloads application programs 108 onto the storage 106 of the wireless telephone 100 at the time the wireless telephone 100 is manufactured. These application programs 108 include games, books, or any other type of data or software programs. The application programs 108 also may be downloaded onto the wireless telephone 100 over-the-air after the wireless telephone 100 is manufactured.

The manufacturer also downloads a recall program 110 onto the storage 106 of the wireless telephone 100 at the time the wireless telephone 100 is manufactured. The recall program 110 also may be installed over-the-air after the wireless telephone 100 is manufactured.

As discussed in more detail below, the recall program 110, when executed by the wireless telephone 100, uninstalls one or more targeted application programs 109 stored on the wireless telephone 100. The targeted application program 109 is an application program 108 that needs to be uninstalled from the wireless telephone 100 for various reasons discussed below. The recall program 110 may additionally or alternatively be programmed to disable the targeted application program 109 or reprogram it to perform differently.

In an alternative embodiment, discussed below, the wireless telephone 100 is programmed to periodically poll a recall command source 222 (discussed in connection with FIG. 2) for any instructions to recall a targeted application program 109. In this embodiment, a recall polling program 111 is downloaded onto the storage 106 of the wireless telephone 100 at the time the wireless telephone 100 is manufactured. The recall polling program 111 is software that is self-executing at different intervals. The recall polling program 111 may automatically execute every time the wireless telephone 100 is turned on by a user, and/or at periodic time intervals while the wireless telephone 100 is being operated by a user, and/or at times pre-determined by the program (such as pre-determined dates or times of day).

The wireless telephone 100 also includes a local database 112 installed by the manufacturer. Sample contents of the local database 112 are illustrated in FIG. 3b. The local database 112 contains, at a minimum, a record of the application identification 302 unique to each application program 108 stored on the wireless telephone 100. Additionally, the local database 112 may contain a record of the location 314 of the application programs 108 within the storage 106 on the wireless telephone 100 and any other information useful for keeping track of which application programs 108 are downloaded on the wireless telephone 100, and where they are located.

The application identifications 302 for the application programs 108 maintained in the local database 112 correspond to the same application identifications 302 for the application programs 108 maintained in a program manager database 204 (FIG. 2, discussed below). For example, the application identification 302 for an application program 108 maintained on the program manager database 204 for "Race car 104Z" is identical to the application identification 302 for that application program 108 on the local database 112 on the wireless telephone 100.

The wireless telephone 100 further includes a download client 114. The download client 114 is a software program within the API 104 that directs where each application program 108 is stored as it is downloaded over-the-air onto the wireless telephone 100. The download client 114 also maintains a record of where each application program 108 is stored within the storage 106 for the wireless telephone 100.

Network

FIG. 2 illustrates an example of a network 200 over which a network-initiated recall command 216 is broadcast to wireless telephones 100 carrying a targeted application program 109. The network 200 includes various components linked in various manners. The network 200 described below is exemplary, only. For purposes of the present invention, the network 200 includes any system whereby remote modules, such as wireless telephones 100, communicate over-the-air between and among each other and/or between and among components of a wireless network, including, without limitation, wireless network carriers and/or servers.

Referring to FIG. 2, the network 200 includes at one end a program manager 202.

The program manager 202 is any entity (company) that has developed and provided the API 104 to wireless telephone 203 manufacturers for installation on the wireless telephones 203. The program manager 202 also is the entity that certifies the application programs 108 as compatible with the APIs 104 installed on the wireless telephones 203.

The program manager 202 maintains a program manager database 204. Sample contents of the program manager database 204 are illustrated in FIG. 3a. The program manager database 204 contains, at a minimum, a record of the application identifications 302 representing each application program 108 downloaded at any time onto each wireless telephone 203 in the network 200, an Electronic Service Number ("ESN") 304 representing the individual who downloaded the application program 108, and a Mobile Identification Number ("MIN") 306 unique to the wireless telephone 203 carrying that application program 108. Optionally, the program manager database 204 contains records of the wireless telephone model 308, wireless network carrier 310, the region where the wireless telephone is used 312, and any other information useful to identify which wireless telephones 203 are carrying which application programs 108.

The program manager 202 also includes a recall command source 222. The recall command source 222 is the person(s) or entity that makes the decision to recall one or more targeted application programs 109. The recall command source 222 also is the entity that constructs a recall command 216 (discussed below) that is broadcast to identified wireless telephones 100 carrying the targeted application program(s) 109. Alternatively, and without limitation, the recall command source 222 may be one or more persons or entities involved with the development and issuance of the targeted application program 109, person(s) or entities involved with the manufacturing of the wireless telephones 203, person(s) or entities involved with the function of any parts of the network 200, and/or any component of the network 200.

The program manager 202 communicates with one or more computer servers 206 via a network over the Internet 208 (preferably secured). The servers 206 also communicate with a carrier network 210 via a network over the Internet 208. The carrier network 210 controls messages sent to a messaging service controller ("MSC") 212. The carrier network 210 communicates with the MSC 212 by both the Internet and POTS (plain ordinary telephone system) (collectively identified in FIG. 2 as 211). The Internet connection 211 between the carrier network 210 and the MSC 212 transfers data, and the POTS 211 transfers voice information. The MSC 212, in turn, is connected to multiple base stations ("BTS") 214. The MSC 212 is connected to the BTS by both the Internet 211 (for data transfer) and POTS 211 (for voice information). The BTS 214 broadcast messages wirelessly to the wireless telephones 203 by short messaging service ("SMS"), or any other over-the-air method.

One example of a message broadcast by the BTS 214 in the present invention is a recall command 216. As further discussed herein, the wireless telephone 100 carrying a targeted application program 109, in response to receiving a recall command 216, responds by uninstalling the program 109 stored on the wireless telephone 100. The recall command 216 is constructed by the recall command source 222 (that may or may not be the same person(s) or entities that made the decision to initiate a recall of the targeted application program 109). The recall command 216 is sent by the recall command source 222 over the network 200 to be broadcast to the wireless telephones 100 carrying the targeted application program 109.

Another example of a message broadcast by the BTS 214 is a recall message 218. As further discussed herein, a recall message 218 is a message that is sent over the network 200 by the recall command source 222 to the wireless telephones 100 carrying the targeted application program 109. In response to the recall message 218, the wireless telephones 100 automatically communicate with the recall command source 222. The recall command source 222 sends the wireless telephones 100, at a minimum, the identity of the targeted application program 109 and an instruction to uninstall the targeted application program 109. In response to receiving this information, the wireless telephones 100 uninstall the targeted application program 109. Alternatively, the recall command source 222 sends the wireless telephones 100 an instruction to retrieve the identity of the targeted application program 109 from another component of the network 200, including without limitation, a server 206.

As shown in FIG. 2, the network 200 includes many wireless telephones 203, each capable of communicating wirelessly with various other network components 200 via the BTS 214. In the present invention, identified wireless telephones 100 contain a targeted application program 109 that is recalled through the use of recall commands 216 or recall messages 218 initiated by portions of the network 200 other than the wireless telephones 203 themselves. However, in another embodiment, the recall process is initiated by wireless telephones 224 carrying the recall polling program 111. This alternative method to conduct a recall is discussed below.

OPERATION

In addition to the various hardware embodiments, described above, a different aspect of the invention concerns a method for constructing a wireless telephone 100 including a recall program 110 resident thereon, and methods of remotely initiating a recall of one or more targeted application programs 109 resident on the wireless telephone 100.

Construction, Configuration, and Use of Wireless Telephone

Figure 4:
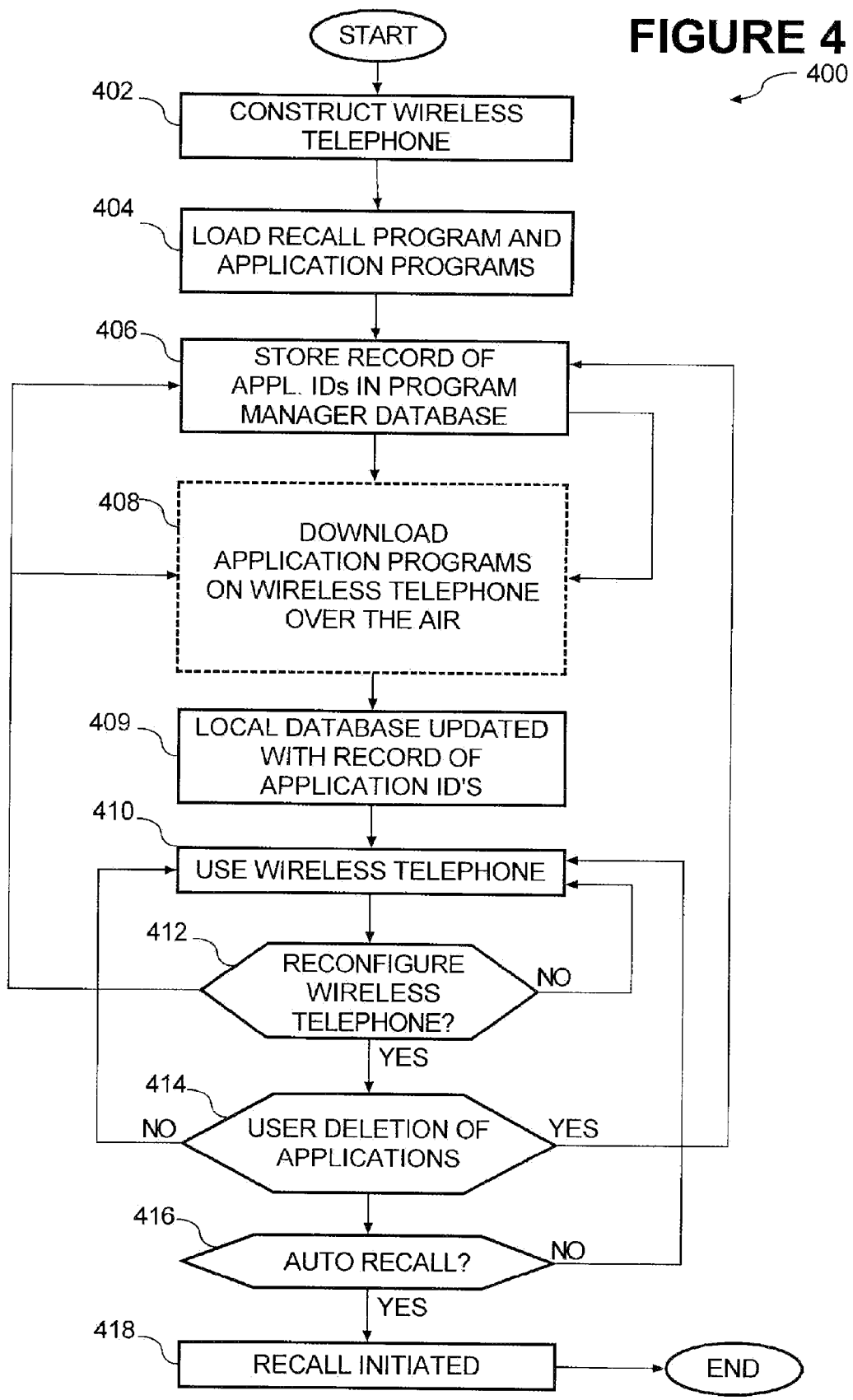
FIG. 4 is a flowchart of an operational sequence for the construction of a wireless telephone with a recall program resident thereon in accordance with the invention.

FIG. 4 shows a sequence 400 to illustrate one example of the construction, configuration, and use of a wireless telephone 100 with a recall program 110 resident thereon. For ease of explanation, but without any limitation intended thereby, the example of FIG. 4 is described in the context of the hardware environment described above.

In step 402, the wireless telephone 100 is constructed by a manufacturer. In step 404, the manufacturer downloads the recall program 110 into the storage 106 on the wireless telephone 100. In step 404, the manufacturer also downloads one or more application programs 108 onto the wireless telephone 100.

In step 406, the program manager 202 updates the program manager database 204 to include a record of the application identification 302 representing each application program 108 downloaded onto each manufactured wireless telephone 100. This information may come directly from the manufacturer.

In step 408, the wireless telephone 100 receives downloads of one or more application programs 108 over-the-air. While the application programs 108 are certified by the program manager 202, the actual programs are maintained at the carrier network 210 (but may be maintained at any location in the network 200 capable of sending the application programs 108 to the BTS 214 to be broadcast to the wireless telephone 100.) The user of the wireless telephone 100 operates the wireless telephone 100 to communicate over the network 200 with the servers 206 to select a desired application program 108. In response, the carrier network 210 sends the application program 108 to the MSC 212 to be transferred to the BTS 214 that broadcast the application program 108 to the wireless telephone 100.

In response to the wireless telephone 100 receiving the application program 108, the download client 114 on the wireless telephone 100 directs the application program 108 to a particular location within the storage 106 on the wireless telephone 100, where the application program 108 is stored.

Also in step 408, either the server 206 or the carrier network 210 communicates the application identification 302 unique to the application program 108 that has been downloaded onto the wireless telephone 100 to the program manager 202. The program manager 202 updates the program manager database 204 with a record of the application identification 302 representing the additional application program 108 that has been downloaded onto the wireless telephone 100 (step 406).

In step 409, the wireless telephone 100 updates its local database 112 to include a record of the application identification 302 unique to the application program 108 that has been downloaded onto the wireless telephone 100. Thus, the records of the application identifications 302 maintained on the wireless telephone 100 in the local database 112 are identical to the records of the application identifications 302 maintained on the wireless telephone 100 in the program manager database 204.

In step 410, the wireless telephone 100 is operated to communicate and/or run the application programs 108 stored on the wireless telephone 100. For example, the wireless telephone 100 may be operated to run a game of TetrisÔ followed by the initiation of a telephone call.

In step 412, the wireless telephone 100 may be reconfigured so as to store additional or fewer application programs 108. If the wireless telephone 100 is operated to add application programs 108, step 408 and the update of the application identifications 302 in step 406 are repeated.

Conversely, in step 414, if the wireless telephone 100 is operated to delete one or more application programs 108, the wireless telephone 100 directs the download client 114 to locate the application program 108 to be deleted, and uninstalls the application program 108. After the application program 108 is deleted, the wireless telephone 100 automatically updates its local database 112 to delete the record of the application identification 302 representing the deleted application program 108. The wireless telephone 100 also automatically sends a message over the network 200 to the program manager 202 notifying the program manager 202 of the deleted application program 108. In response, the program manager 202 updates the record of application identifications 302 corresponding to that wireless telephone 100 maintained in the program manager database 204 (step 406).

In step 416, as opposed to user operation of the wireless telephone 100 to delete an application program 108 from the wireless telephone 100, a recall command source 222 decides to recall one or more of the application programs 108. In step 418, the recall command source 222 initiates the recall process, as discussed below, and the sequence 400 ends.

Recall Command

Figure 5:
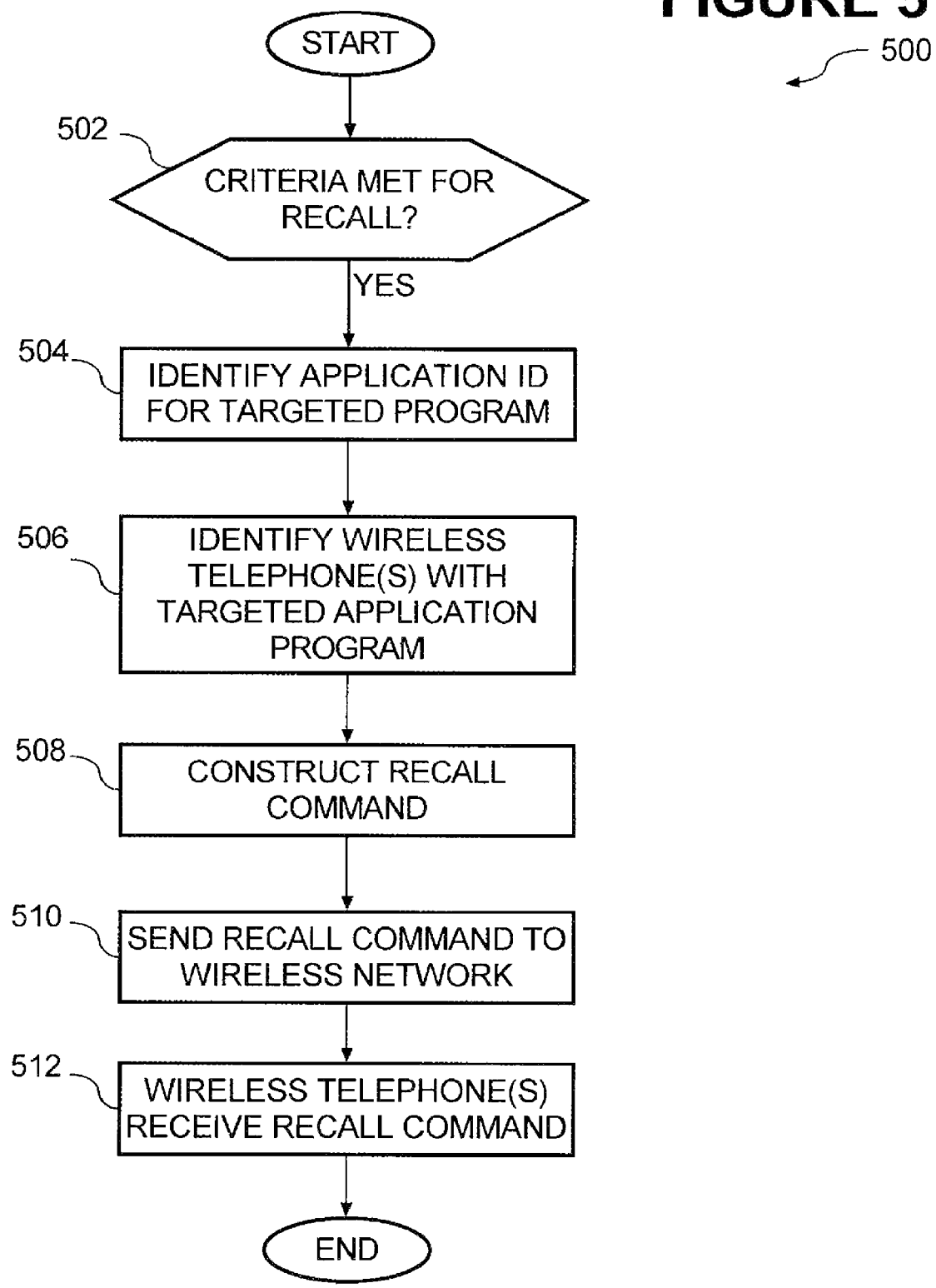
FIG. 5 is a flowchart of an operational sequence for sending a network initiated recall command over the wireless network in accordance with the invention.

FIG. 5 shows a sequence 500 to illustrate an example of a recall command source 222 constructing a recall command 216 and sending the recall command 216 over the network 200 to be broadcast to wireless telephones 100 identified as carrying the targeted application program 109 that needs to be uninstalled or disabled. For ease of explanation, but without any limitation intended thereby, the example of FIG. 5 is described in the context of the hardware environment of FIGS. 1-3.

In step 502, the recall command source 222 determines whether criteria are met for a recall of one or more targeted application programs 109. The recall command source 222 may commence a recall under a number of circumstances, such as notification from any part of the network 200 that wireless telephones 100 in the network 200 are not operating correctly and/or are crashing when a user operates the targeted application program 109; developers of the targeted application program 109 contacting any part of the network 200 to notify it of an error in the targeted application program 109; users of the wireless telephone contacting any part of the network 200 with complaints about the targeted application program 109; any part of the network 200 receiving statistical feedback of problems with the interaction between the targeted application program 109 and other application programs 108 on the wireless telephone; discovering a software virus in the targeted application program 109; and/or discovering that the user's operation of the targeted application program 109 increases the amount of radio frequency emitted from the wireless telephone 100 such that operation of the targeted application program 109 poses a safety risk.

In step 502, the actual decision to recall made by the recall command source 222 may be reached by an individual, a committee, or be electronically determined, for example, from statistical feedback from the wireless telephones 100 or other parts of the network 200. The scope of the recall would depend on the nature of the problem, and the number of wireless telephones 100 affected by the problem. For example, the recall may extend to all wireless telephones 203 in the network 200, all wireless telephones 100 within a particular geographic region, specific wireless telephone 100 models, a range of ESNs 304, or a single wireless telephone 100.

In step 504, the recall command source 222 contacts the program manager 202 to obtain the unique application identification 302 representing the targeted application program 109 (assuming this information is not already available to the recall command source 222). In step 506, the program manager 202 researches the program manager database 204 that maintains the application identifications 302 representing each application program 108 stored on each wireless telephone 100 in the network 200. By searching the program manager database 204 for the application identification 302 of the targeted application program 109, the program manager 202 determines exactly which wireless telephones 100 in the network 200 contain the targeted application program 109, and this information is communicated by the program manager 202 to the recall command source 222.

In step 508, the recall command source 222 constructs a recall command 216. The recall command 216 contains, at a minimum, the application identification 302 representing the targeted application program 109 and an instruction to the wireless telephone 100 to uninstall the targeted application program 109. The recall command 216 is written as an SMS, but may be in any format that may be sent from the program manager 202 to the BTS 214 and broadcast over-the-air to the wireless telephones 100. Alternatively, the recall command source 222 may send the information necessary to construct the recall command 216 over the network 200 to the BTS 214, that in turn, may construct the recall command 216.

In step 510, after the recall command 216 is constructed and is at the BTS 214, the BTS 214 broadcast the recall command 216 to the identified wireless telephones 100. The instruction to broadcast may be included as part of the recall command 216 or separately programmed at the BTS 214. The BTS may broadcast the recall command 216 in any cellular interface, including AMPS, PCS, GSM or CDMA.

In step 512, the wireless telephones 100 receive the recall command 216, responsive to which, the wireless telephones 100 automatically uninstall the targeted application program 109, as discussed below.

Recall Message

Instead of the recall command source 222 constructing a recall command 216 that contains all of the information needed by the wireless telephone 100 to uninstall the targeted application program 109, alternatively, the recall command source 222 may construct and cause to be broadcast a more limited recall message 218. The recall message 218 is a message to the wireless telephone 100 that directs the wireless telephone 100 to automatically initiate communications with the recall command source 222. These communications are transparent to a user of the wireless telephone 100. The recall command source 222 in turn provides the wireless telephone 100 with sufficient information to identify the targeted application program 109 to be uninstalled and an instruction to uninstall the targeted application program 109. The recall command source 222 also may provide the wireless telephone 100 with the recall program 110 necessary to uninstall the targeted application program 109. Responsive to receiving the identity of the targeted application program 109 (and, alternatively, a recall program 110), the wireless telephone 100 uninstalls the targeted application program 109 in the manner described below.

Alternatively, the recall command source 222 may send the wireless telephone 100 a recall message 218 containing an instruction to retrieve information necessary to uninstall the targeted application program 109 from another component of the network 200, including without limitation, a server 206. Transparent to a user of the wireless telephone 100, in response to this recall message 218, the wireless telephone 100 obtains the identity of the targeted application program 109, an instruction to uninstall the targeted application program 109, and alternatively, a recall program 110, from another component of the network 200.

Polling for Recall Command

As an alternative to a recall process initiated by the recall command source 222, in another embodiment, the recall process is initiated by the wireless telephones 224 themselves. In this embodiment, the wireless telephones 224 have the recall polling program 111 downloaded on the telephones 224. The wireless telephones 224 automatically execute the recall polling program 111 at different intervals so that the wireless telephones 224 are checking for any instructions to uninstall a targeted application program 109.

When executed, the recall polling program 111 causes the wireless telephone 224 to automatically send a message by any over-the-air means to a recall command source 222. The recall command source 222 is the person(s), entity or network 200 component that makes the decision to recall one or more targeted application programs 109. Alternatively, and without limitation, the recall command source 222 may be one or more persons or entities involved with the development and issuance of the targeted application program 109, person(s) or entities involved with the manufacturing of the wireless telephones 203, and/or person(s) or entities involved with the function of any components of the network 200, and/or any component of the network 200.

The polling message sent by the wireless telephone 224 to the recall command source 222 requests that the recall command source 222 send the wireless telephone 224 a recall command 216 to uninstall any targeted application program 109. This "polling" for a recall command 216 may be done in various ways. For example, the polling message sent by the wireless telephone 224 may include identifying information about the wireless telephone 224 sufficient for the recall command source 222 to determine which application programs 108 are downloaded on that particular wireless telephone 224. The recall command source 222 may make this determination by referencing the program manager database 204 containing information about each application program 108 downloaded on each wireless telephone 203 in the network 200. If the recall command source 222 determines that there is a match between the application programs 108 downloaded on that particular wireless telephone 224, and the targeted application program 109, the recall command source 222 may proceed with sending the recall command 216. If there is no match, the recall command source 222 does not send a recall command 216.

Conversely, the recall command source 222 may, in response to receiving the polling message from the wireless telephone 224, automatically send any existing recall commands 216 to the wireless telephone 224. The wireless telephone 224, upon receiving the recall command 216, determines whether the targeted application program 109 is resident upon the wireless telephone 224. If so, the wireless telephone 224 proceeds with uninstalling the targeted application program 109.

As with the previous embodiments, the recall command 216 sent in response to a polling message contains, at a minimum, the application identification 302 representing the targeted application program 109, and an instruction to the wireless telephone 224 to uninstall that program. Alternatively, the recall command 216 may instruct the wireless telephone 224 to send a message to another component of the network 200 (such as a server 206) to obtain the information necessary to complete the recall. As another alternative, an abbreviated version of the recall command 216 may be implemented, where the recall command 216 includes information representing the identity of any application programs 108 that need to be uninstalled, the mere presence of the recall command in the recall command source 222 serving as an implied instruction for the telephone to execute the command.

Uninstallation of Targeted Application Program

Figure 6:
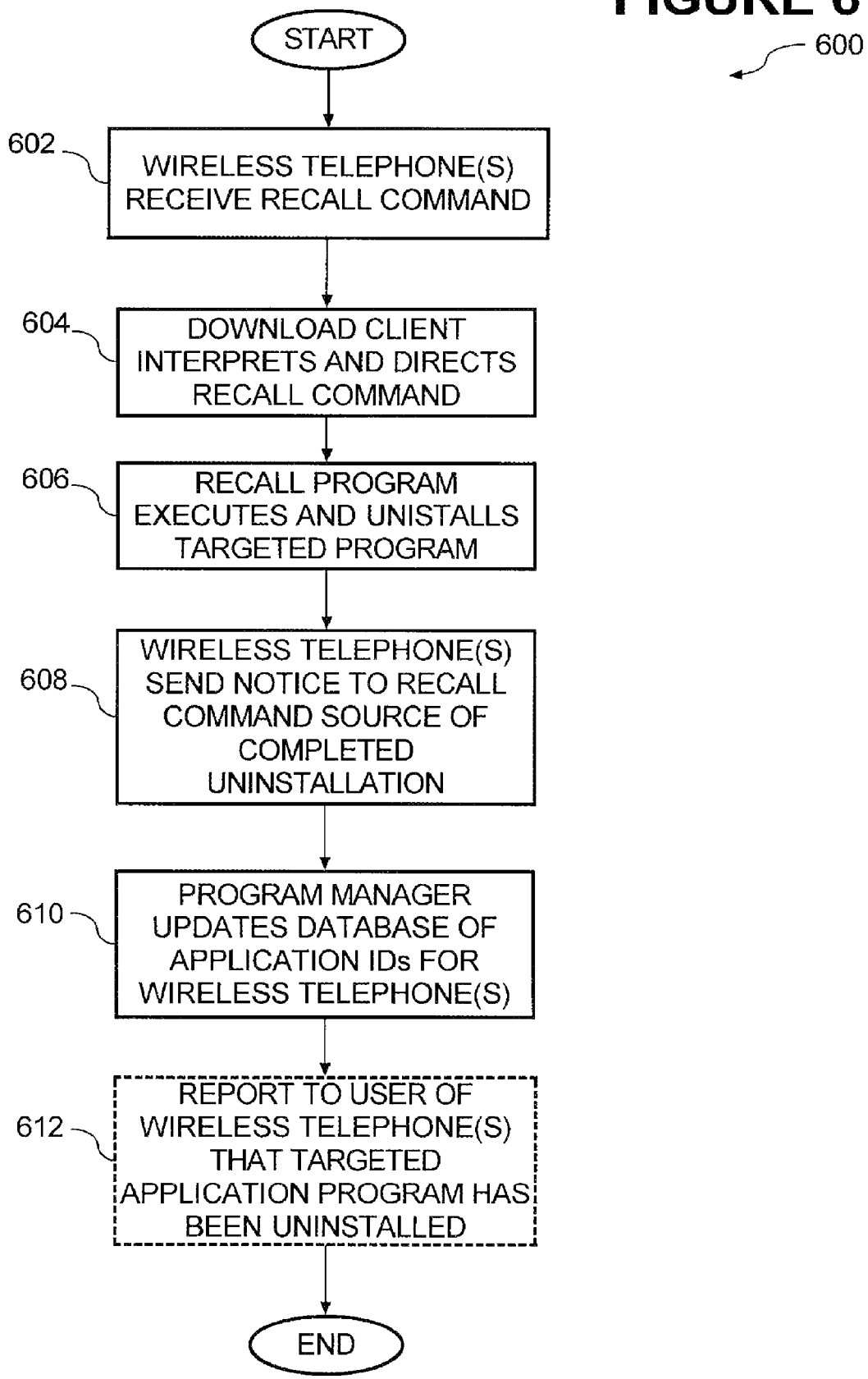
FIG. 6 is a flowchart of an operational sequence performed by a wireless telephone to uninstall a targeted application program on the wireless telephone in accordance with the invention.

FIG. 6 shows a sequence 600 to illustrate one example of the uninstallation of a targeted application program 109 stored on the wireless telephone 100 after the wireless telephone 100 receives a recall command 216 or otherwise receives the identity of a targeted application program 109 and an instruction to uninstall that program.

For ease of explanation, but without any limitation intended thereby, the example of FIG. 6 is described in the context of the hardware environment described in FIGS. 1-3. In step 602, the wireless telephone 100 receives the recall command 216 broadcast from the BTS 214 in the network 200.

In step 604, in response to receiving the recall command 216 (or the identity of a targeted application program 109 and an instruction to uninstall that program), the download client 114 on the wireless telephone 100 interprets the recall command 216 to determine the application identification 302 representing the targeted application program 109. The download client 114 then sends the recall command 216 to the recall program 110 installed on the wireless telephone 100. The download client 114 also communicates to the recall program 110 information representing the location of the targeted application program 109 in the storage 106.

In step 606, the recall command 216 reaches the recall program 110 where it causes the recall program to execute and automatically uninstall the targeted application program 109. Alternatively, the recall program 110 may disable the targeted application program 109, or take any other action that would cause the targeted application program 109 to no longer function. The recall program 110 also may be programmed to delete the recall command 216 after the uninstallation is performed.

In step 608, the wireless telephone 100 automatically reports the completed uninstallation of the targeted application program 109 to the recall command source 222. This report may be completed by an SMS or any other form of over-the-air message sent through the network 200.

In step 610, the recall command source 222 communicates the confirmation of the uninstallation to the program manager 202 (this step assumes that the recall command source 222 and the program manager 202 are not the same entity). The program manager 202 updates the program manager database 204 to reflect the fact that the wireless telephone 100 no longer contains the targeted application program 109 in an operable form. To do this, the program manager 202 deletes the application identification 302 representing the targeted application program 109 from the list of application programs 108 downloaded on that particular wireless telephone 100.

In step 612, the wireless telephone 100 optionally automatically reports to the user of the wireless telephone 100 that the targeted application program 109 is no longer operable and/or has been uninstalled. The form and wording of this report may be included in the recall command 216, and the recall program 110 on the wireless telephone 100 may be programmed to cause the wireless telephone 100 to make the report to the user in response to an instruction in the recall command 216. The report may contain the reason(s) behind the recall. The report also may direct the user of the wireless telephone 100 to a customer service department or any third party to obtain information regarding the recall.

Signal Bearing Medium/Circuitry

As discussed above, the invention concerns methods including network-initiated uninstallation of one or more targeted application programs 109 resident upon a wireless telephone 100, and constructing a wireless telephone 100 including a recall program 110 resident thereon. The invention also concerns methods for a wireless telephone 224 polling the network 200 to obtain recall commands 216 to uninstall a targeted application program 109, and constructing a wireless telephone 224 with a recall polling program 111 resident thereon.

In the context of FIGS. 1-3, these methods may be implemented, for example, by operating portion(s) of the network 200 to execute a sequence of machine-readable instructions. These instructions may reside in various types of signal-bearing media. This signal-bearing media may comprise, for example, RAM (not shown) accessible by, or residing within, the components of the network 200. Alternatively, the instructions may be contained in another signal-bearing media, such as a magnetic data storage diskette (not shown). Whether contained in RAM, a diskette, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog.

As for the wireless telephones 203, the methods discussed herein may be implemented with any type of circuitry, microprocessors, or other types of hardware in the wireless telephone 203.

OTHER EMBODIMENTS

While the foregoing disclosure shows illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A non-transitory computer-readable storage medium containing instructions stored thereon, which, when executed by a wireless device capable of communicating over a wireless network and having operating software for supporting a computer platform on said wireless device capable of executing applications, cause the wireless device to perform operations, the instructions comprising:

instructions to boot-up the wireless device, said instructions to boot-up configured to initialize said wireless device for normal communications over the wireless network;

instructions to remotely receive, after the instructions to boot-up boots-up the wireless device, a recall command including a unique application identification for a targeted application available for execution on said computer platform of said wireless device; and instructions to uninstall, responsive to said recall command, said targeted application without requiring end-user interaction, wherein the uninstallation of the targeted application results in the targeted application no longer functioning.

2. The non-transitory computer-readable storage medium of claim 1, wherein the recall command comprises an identification of said targeted application and an instruction for causing said wireless device to delete said targeted application.

3. The non-transitory computer-readable storage medium of claim 1, wherein the recall command is sent to the wireless device via a short message service (SMS) message.

4. The non-transitory computer-readable storage medium of claim 1, wherein the instructions to uninstall include:
  instructions to search a database on said wireless device using said unique application identification to determine an address range corresponding to said targeted application; and
  instructions to delete contents of said address range.

5. The non-transitory computer-readable storage medium of claim 1, wherein each recall command further comprises:
  an uninstall application, which when executed by the wireless device, deletes said targeted application.

6. The non-transitory computer-readable storage medium of claim 1, further comprising:
  instructions to send a poll message to a server to request that the server evaluate whether to recall the targeted application,
  wherein the instructions to remotely receive receives the recall command from the server in response to the poll message.

7. A wireless device capable of communicating over a wireless network and having operating software for supporting a computer platform on said wireless device capable of executing applications, comprising:
  a processor coupled to a memory, the processor configured to:
    boot-up the wireless device, wherein logic configured to boot-up is configured to initialize said wireless device for normal communications over the wireless network;
    remotely receive, after the logic configured to boot-up boots-up the wireless device, a recall command including a unique application identification for a targeted application available for execution on said computer platform of said wireless device; and
    uninstall, responsive to said recall command, said targeted application without requiring end-user interaction, wherein the uninstallation of the targeted application results in the targeted application no longer functioning.

8. The wireless device of claim 7, wherein the recall command comprises an identification of said targeted application and an instruction for causing said wireless device to delete said targeted application.

9. The wireless device of claim 7, wherein the recall command is sent to the wireless device via a short message service (SMS) message.

10. The wireless device of claim 7, wherein, for the uninstall, the processor is further configured to:
  search a database on said wireless device using said unique application identification to determine an address range corresponding to said targeted application; and
  delete contents of said address range.

11. The wireless device of claim 7, wherein each recall command further comprises:
  an uninstall application, which when executed by the wireless device, deletes said targeted application.

12. The wireless device of claim 7, wherein the processor is further configured to:
  send a poll message to a server to request that the server evaluate whether to recall the targeted application,
  remotely receive the recall command from the server in response to the poll message.

13. A method for a wireless device capable of communicating over a wireless network and having operating software for supporting a computer platform on said wireless device capable of executing applications, comprising:
  booting-up the wireless device, said booting-up including initializing said wireless device for normal communications over the wireless network;
  after said booting-up, checking-in with a server on said wireless network to determine whether to uninstall a targeted application on said wireless device without requiring end-user interaction;
  in response to the server check-in, remotely receiving a recall command including a unique application identification for the targeted application; and
  responsive to said recall command, uninstalling said targeted application without requiring end-user interaction, wherein the uninstallation of said targeted application results in the targeted application no longer functioning.

14. The method of claim 13, wherein the checking-in with the server includes:
  sending a poll message to the server to request that the server evaluate whether to recall the targeted application available for execution on said computer platform of said wireless device,
  wherein the remotely receiving receives the recall command from the server in response to the poll message.

15. A wireless device capable of communicating over a wireless network and having operating software for supporting a computer platform on said wireless device capable of executing applications, comprising:
  means for booting-up the wireless device, said booting-up including initializing said wireless device for normal communications over the wireless network;
  means for, after said booting-up, checking-in with a server on said wireless network to determine whether to uninstall a targeted application on said wireless device without requiring end-user interaction;
  means for, in response to the server check-in, remotely receiving a recall command including a unique application identification for the targeted application; and
  means for, responsive to said recall command, uninstalling said targeted application without requiring end-user interaction, wherein the uninstallation of said targeted application results in the targeted application no longer functioning.

16. The wireless device of claim 15, wherein the means for checking-in with the server is configured to send a poll message to the server to request that the server evaluate whether to recall the targeted application available for execution on said computer platform of said wireless device,
  wherein the means for remotely receiving receives the recall command from the server in response to the poll message.

17. A wireless device capable of communicating over a wireless network and having operating software for supporting a computer platform on said wireless device capable of executing applications, comprising:

a processor coupled to memory, the processor configured to:
    boot-up the wireless device, said booting up boot-up including initializing said wireless device for normal communications over the wireless network;
    check-in, after said boot-up, with a server on said wireless network to determine whether to uninstall a targeted application on said wireless device without requiring end-user interaction;
    remotely receive the recall message including a unique application identification for the targeted application, in response to the server check-in; and
    uninstall said targeted application without requiring end-user interaction, wherein the uninstallation of said targeted application results in the targeted application no longer functioning, responsive to said recall message.

18. The wireless device of claim 17, wherein the processor is further configured to:
    evaluate whether to recall the targeted application available for execution on said computer platform of said wireless device; and
    receive the recall message from the server in response to the poll message.

19. A non-transitory computer-readable storage medium containing instructions stored thereon, which, when executed by a wireless device capable of communicating over a wireless network and having operating software for supporting a computer platform on said wireless device capable of executing applications, cause the wireless device to perform operations, the instructions comprising:
    instructions to boot-up the wireless device, said booting-up including initializing said wireless device for normal communications over the wireless network;
    instructions to, after said boot-up, check-in with a server on said wireless network to determine whether to uninstall a targeted application on said wireless device without requiring end-user interaction;
    instructions to, in response to the server check-in, remotely receive a recall message including a unique application identification for the targeted application; and
    instructions to, responsive to said recall message, uninstall said targeted application without requiring end-user interaction, wherein the uninstallation of said targeted application results in the targeted application no longer functioning.

20. The non-transitory computer-readable storage medium of claim 19, wherein the instructions to check-in with the server is configured to send a poll message to the server to request that the server evaluate whether to recall the targeted application available for execution on said computer platform of said wireless device,
    wherein the instructions to remotely receive receives the recall message from the server in response to the poll message.

21. A method of operating a server configured to recall a targeted application installed on a subset of wireless devices selected from a set of wireless devices, said server capable of communicating with the set of wireless devices over a wireless network, comprising:
    identifying each application installed on each wireless device of said set;
    searching a database to identify said subset of wireless devices having said targeted application installed thereon; and
    sending an application recall command including a unique application identification for the targeted application to each wireless device in said subset, the application recall command configured to initiate uninstallation of said targeted application without requiring user interaction on the wireless devices, wherein the uninstallation of said targeted application on each wireless device results in the targeted application no longer functioning on each wireless device.

22. The method of claim 21, further comprising:
    receiving a polling message from at least one wireless device of said set,
    wherein the identifying is performed based on the received polling message.

23. The method of claim 21, wherein each application recall command comprises an instruction for causing one of said wireless devices from said subset of wireless devices to delete said targeted application.

24. The method of claim 21, wherein the sending includes sending the application recall command via a short message service (SMS) message.

25. The method of claim 21, wherein each application recall command further comprises:
    an uninstall application, which when executed by a given wireless device among the subset of wireless devices, deletes said targeted application.

26. A server configured to recall a targeted application installed on a subset of wireless devices selected from a set of wireless devices, said server capable of communicating with the set of wireless devices over a wireless network, comprising:
    means for identifying each application installed on each wireless device of said set of wireless devices;
    means for searching a database to identify said subset of wireless devices having said targeted application installed thereon; and
    means for sending an application recall command including a unique application identification for the targeted application to each wireless device in said subset, the application recall command configured to initiate uninstallation of said targeted application without requiring user interaction on the wireless devices, wherein the uninstallation of said targeted application on each wireless device results in the targeted application no longer functioning on each wireless device.

27. The server of claim 26, further comprising:
    means for receiving a polling message from at least one wireless device of said set of wireless devices,
    wherein the means for identifying performs application identification based on the received polling message.

28. A non-transitory computer-readable storage medium containing instructions stored thereon, which, when executed by server configured to recall a targeted application installed on a subset of wireless devices selected from a set of wireless devices, said server capable of communicating with the set of wireless devices over a wireless network, cause the server to perform operations, the instructions comprising:
    instructions to identify each application installed on each wireless device of said set of wireless devices;
    instructions to search a database to identify said subset of wireless devices having said targeted application installed thereon; and
    instructions to send an application recall command including a unique application identification for the targeted application to each wireless device in said subset, the application recall command configured to initiate uninstallation of said targeted application without requiring user interaction on the wireless devices, wherein the uninstallation of said targeted application on each wireless device results in the targeted application no longer functioning on each wireless device.

29. The server of claim 28, further comprising:
instructions receive a polling message from at least one wireless device of said set of wireless devices, wherein the instructions identify performs application identification based on the received polling message.

* * * * *